Nov. 8, 1949 — C. NORLAND — 2,487,267
POULTRY DRINKING TROUGH
Filed Nov. 5, 1945
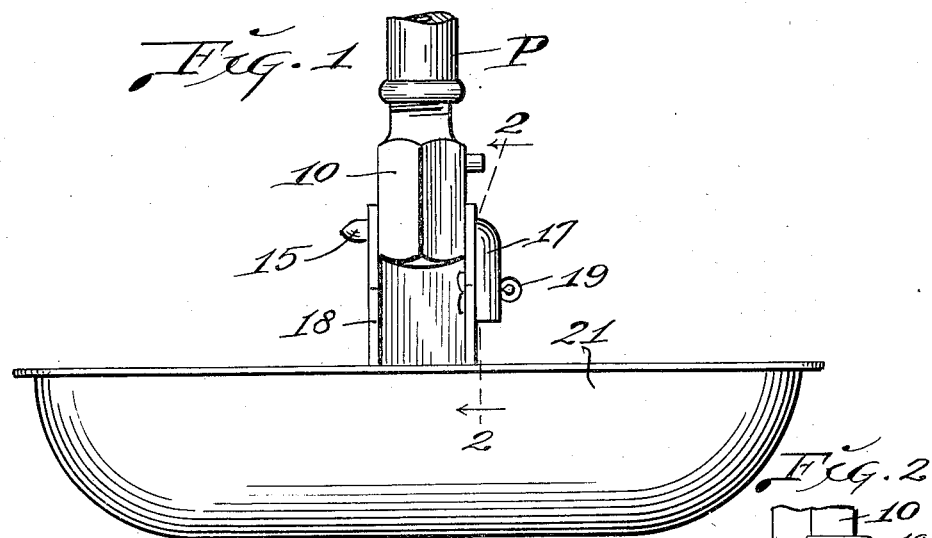
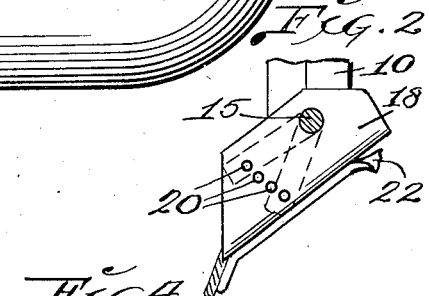
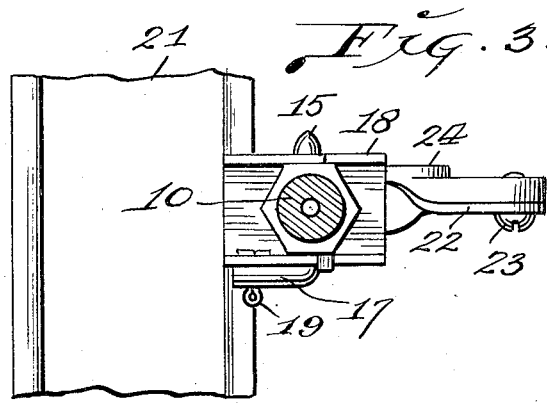
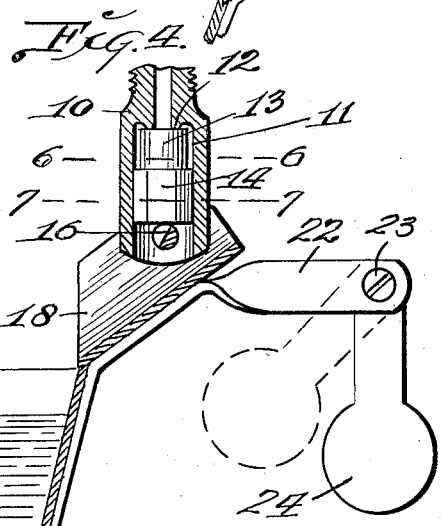
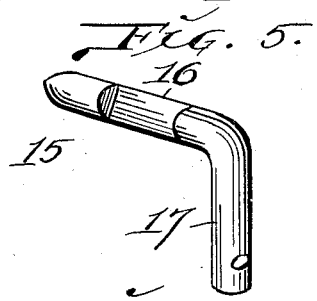
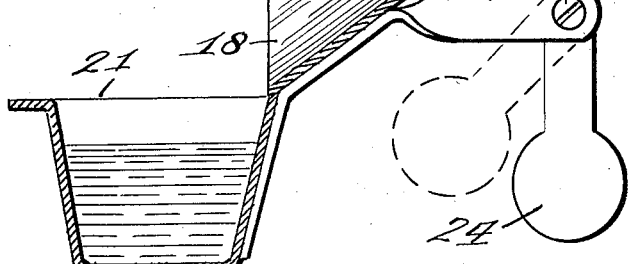
INVENTOR.
CLARENCE NORLAND.
BY Martin P. Smith,
ATTY.

Patented Nov. 8, 1949

2,487,267

UNITED STATES PATENT OFFICE 2,487,267

POULTRY DRINKING TROUGH

Clarence Norland, Cypress, Calif.

Application November 5, 1945, Serial No. 626,755

4 Claims. (Cl. 137—68)

1

My invention relates to a drinking trough for poultry, livestock and the like and has for its principal object, to provide a simple, practical and inexpensive trough, wherein the refilling or supply of water thereto, is automatically controlled by the weight of the volume of water within said trough, as that an ample supply of water, without waste, is always maintained in the trough.

Further objects of my invention are, to provide in a watering trough of the character described, a novel form of adjustable eccentric for closing the valve which controls the supply of water to the trough and further, to provide an adjustable counterbalancing weight for the trough so as to more accurately control the movements thereof.

With the foregoing and other objects in view, my invention consists in certain novel features of construction and arrangements of parts which will be hereinafter more fully described and claimed and illustrated in the accompanying drawings, in which:

Fig. 1 is a front elevational view of the trough.

Fig. 2 is a detail section taken on the line 2—2 of Fig. 1.

Fig. 3 is a plan view of the trough and the water supply valve associated.

Fig. 4 is a vertical section taken on the line 4—4 of Fig. 3.

Fig. 5 is a perspective view of the valve actuating eccentric.

Fig. 6 is a horizontal section taken on the line 6—6 of Fig. 4.

Fig. 7 is a horizontal section taken on the line 7—7 of Fig. 4.

Referring by numerals to the accompanying drawings which illustrate a preferred embodiment of my invention, 10 designates a valve housing having a chamber 11 open at its lower end and said housing being detachably connected to a water supply pipe P.

Formed in the upper end of chamber 11 around the duct leading thereto, is a seat 12, for a plug valve 13, preferably of rubber, slightly smaller in diameter than chamber 11 and loosely arranged beneath said valve is a plunger 14, which is square or non circular in cross section.

Loosely arranged in bearings in the lower portion of housing 10, is a transverse shaft 15 and that portion of said shaft beneath plunger 14, is cut away diametrically so as to form an eccentric 16, half round in cross section upon which said plunger 14 rests.

Outside housing 10, a crank arm 17 extends

2 downward from the end of shaft 15 and is adjustably connected to one of the side walls of a short inclined chute 18, by means of cotter pin 19 that passes through any one of a series of apertures 20 formed through the chute wall and which apertures are arranged in an arcuate row concentric with the axis of shaft 15 (see Fig. 2).

This arrangement permits rotative adjustment of eccentric 16. Chute 18, which is suspended from shaft 15 and positioned directly beneath within housing 10, is secured at its lower end to the upper edge of one of the side walls of a trough 21, preferably formed in a single piece, from sheet metal or plastics and secured to the underside of said chute in an outwardly projecting arm 22, to the outer end of which is adjustably connected by means of a screw or bolt and nut 23, a short arm that carries a trough counterbalancing weight 24. This weight is adjusted toward or away from the trough so that the latter, when full or nearly full of water, occupies a horizontal position, as seen in Figs. 1 and 4.

As water is taken from the trough by poultry or animals, the decrease in weight of the water remaining in the trough, will permit the latter to swing upward under the influence of weight 24, thereby rocking shaft 15, so as to move eccentric 16 rearwardly and downwardly and as plunger 14 lowers, the plug valve 13 will follow downwardly, thus permitting water to flow from supply pipe P, past said valve and plunger into chute 18, and from thence into the trough.

The weight of the water thus delivered to the trough will, in a short time, counterbalance weight 24 so that the trough lowers to its normal horizontal position and as shaft 15 is rocked, the eccentric will move upward to raise plunger 14 and reseat valve 13 and thereby cut off further flow of water through the valve.

Thus, in effect, arm 22 and weight 24 provide an adjustable weighted lever to compensate for the weight of trough 21 and its contents and to act automatically upon valve 13 so as to maintain the trough filled with water.

Arm 17 of cam shaft 15 is adjustable on the chute 18 so as to control the distance from the top of cam 16 to valve seat 12, and thereby compensate for wear, irregular machining of plug 14 and expansion or contraction of rubber valve 13 under varying temperatures.

Among the particularly desirable features of my invention are, the means including arm 17, cotter pin 19 and arcuate row of apertures for adjusting the position of the eccentric 16, also the adjustable weight 24, for controlling the movement of the trough.

Thus it will be seen that I have provided a poultry drinking fountain which is simple in structure, inexpensive of manufacture, and very effective in performing the functions for which it is intended.

It will be understood that minor changes in the size, form and construction of the various parts of my improved poultry drinking fountain may be made and substituted for those herein shown and described, without departing from the spirit of the invention, the scope of which is set forth in the appended claims.

I claim as my invention:

1. In a poultry drinking fountain, a valve housing connected to a source of water supply, a valve within said housing for controlling the flow of water therethrough, a shaft journalled for operation in said housing, an eccentric on said shaft for engaging said valve, a trough connected to and suspended from said shaft with means for adjusting the operative position of shaft and eccentric.

2. A poultry drinking fountain as set forth in claim 1, including an articulated counterweight carrying arm for said trough.

3. In a poultry drinking fountain, a valve housing connected to a source of water supply, a valve within said housing for controlling the flow of water therethrough, an eccentric mounted for operation in said housing for closing said valve and a trough adjustably connected to and suspended from said eccentric.

4. In a poultry drinking fountain, a valve housing, a valve within said housing for controlling the flow of water therethrough, a chute below said housing, a trough carried by said chute, a shaft passing through the lower portion of said valve housing and through the upper portion of said chute, an eccentric on said shaft for engaging the lower end of said valve, a crank arm on one end of said shaft and means for securing said arm to said chute in differently adjusted positions.

CLARENCE NORLAND.

REFERENCES CITED

The following references are of record in the file of this patent:

UNITED STATES PATENTS

| Number | Name | Date |
|---|---|---|
| 386,752 | Medbury | June 24, 1888 |
| 643,536 | Robinson | Feb. 13, 1900 |
| 1,101,720 | Valliere | June 30, 1914 |